Feb. 21, 1967    A. C. DUCATI    3,304,719
APPARATUS AND METHOD FOR HEATING AND ACCELERATING GAS
Filed July 28, 1964    3 Sheets-Sheet 1

INVENTOR.
ADRIANO C. DUCATI
BY
ATTORNEYS

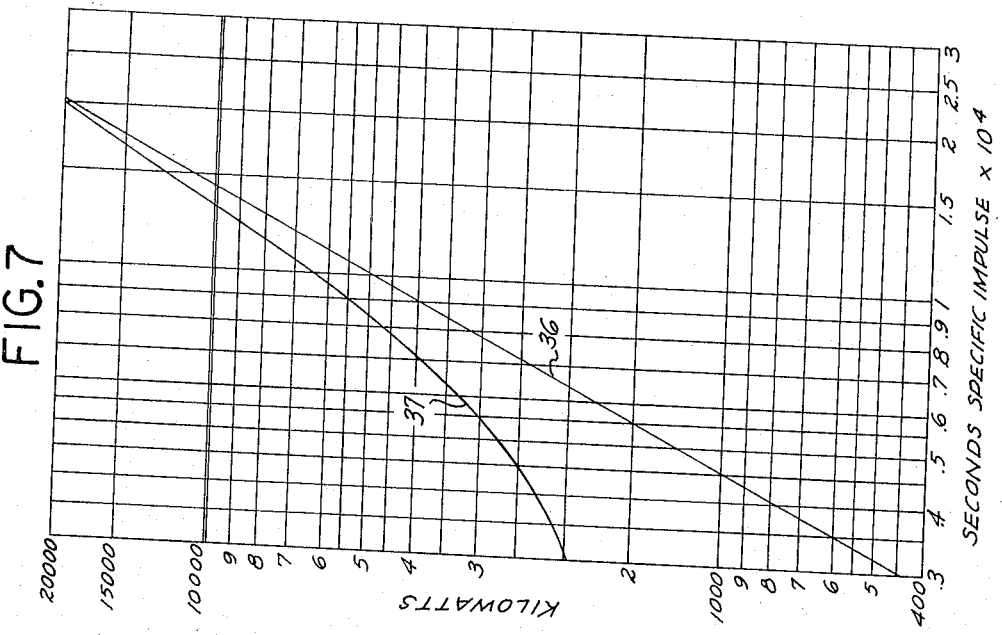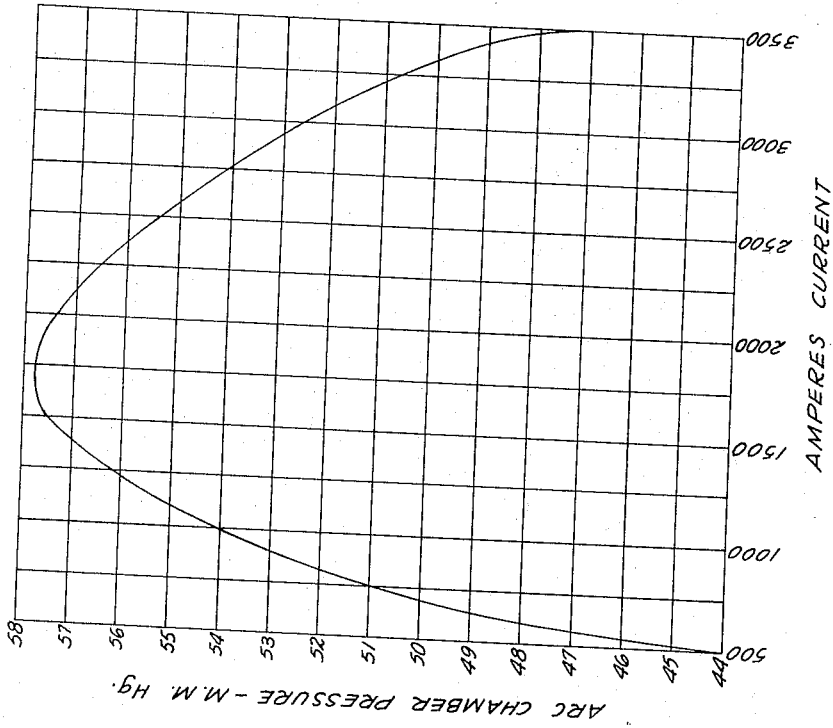

United States Patent Office 3,304,719
Patented Feb. 21, 1967

3,304,719
APPARATUS AND METHOD FOR HEATING AND ACCELERATING GAS
Adriano C. Ducati, Newport Beach, Calif., assignor to Giannini Scientific Corporation, Santa Ana, Calif., a corporation of Delaware
Filed July 28, 1964, Ser. No. 385,702
13 Claims. (Cl. 60—203)

This invention relates to an apparatus and method for heating and accelerating gas, for purposes such as propulsion, chemical synthesis, and cutting of metal workpieces. This application is a continuation-in-part of my co-pending application Ser. No. 286,608, filed June 10, 1963, for Apparatus and Method for Propelling Vehicles in Space.

Electrothermal propulsion systems involve the heating of gas to effect acceleration thereof. Such heating necessarily results in substantial ionization and dissociation of the gas, which ionization and dissociation represent energy which does not produce gas acceleration. In prior-art apparatus, it is customary to attempt to recover such energy by passing the gas through mixing chambers and thermodynamic nozzles intended to permit the gas particles to recombine prior to discharge from the space vehicle. Applicant has discovered, however, that such attempts to recover energy lost in dissociation and ionization are self-defeating because inherent losses in the mixing chamber and/or nozzle (for example, losses resulting from friction, radiation and undirected flow) subtract a larger amount of energy than is added by any recombination of the gas particles.

In view of the above, it is one primary object of the present invention to provide a highly efficient apparatus and method for heating and accelerating gas, the efficiency being achieved for various reasons including the fact that no substantial nozzle is employed.

Prior-art electric-arc apparatus and methods for heating and accelerating gas involve the use of high gas pressures, it being conventionally thought that the discharge of high-pressure gas into a vacuum is desirable. Furthermore, it is conventionally thought that the arc-constriction action achieved by the high-pressure gas is beneficial. Applicant has discovered, however, that the use of high-pressure gas is not normally desirable for reasons including the fact that the high pressures tend to make the cross-section of the discharging gas jet disuniform relative to such factors as temperature and velocity. Such disuniformities result in shear effects which produce large amounts of turbulence, the velocity at the center of the jet being much higher than the peripheral velocity. The disuniformity relative to velocity greatly reduces the efficiency which may be achieved in response to a given power input. Other important disadvantages relative to high pressures will be stated below.

In view of the above, it is another important object of the present invention to provide an apparatus and method for effecting heating and acceleration of gas in a manner producing a relatively uniform-velocity gas jet, characterized by the relative absence of turbulence and other undesirable effects.

Another object is to provide an apparatus and method for mixing particular gases in particular manners adapted to result in substantially uniform gas velocities throughout the entire cross-section of the jet.

Insofar as is known by applicant, it is conventionally thought that the heating and accelerating of gas by means of an electric arc struck to a rear electrode is impractical at currents above approximately fifteen hundred amperes, it being supposed that currents in excess of such value will result in melting of even a tungsten electrode. It is also thought that any increase in current results in a corresponding increase in the gas pressure in the arc chamber, because of the increased heating of the gas caused by the increased current. In accordance with the present method and apparatus, the arc current may be increased to thirty-five hundred amperes and higher, for a long period of time, without resulting in substantial deterioration of the tungsten electrode. Furthermore, it has been discovered that when such high currents are employed the gas pressure in the arc chamber reduces (as current is increased) instead of increasing, probably because of a magnetic effect. These striking results are made possible by factors including the above-mentioned factor relative to drastically reducing the pressure of the gas passed through the apparatus.

In view of the above, it is another important object of the present invention to provide an improved apparatus and method for heating and accelerating gas through use of extremely high currents.

A further object of the present invention is to provide an apparatus and method for effecting chemical synthesis, and other chemical effects, by heating, dissociating and ionizing various substances to extreme degrees.

Another object of the invention is to provide an apparatus and method for effecting working of objects, for example cutting of metal, by use of extremely high-velocity streams or jets which may carry enormous currents.

These and other objects will become apparent from the following detailed description taken in connection with the accompanying drawings in which:

FIGURE 6 is a graph illustrating the expected increase in arc-chamber pressure with increased arc current, up to a certain point, followed by a surprising decrease in arc-chamber pressure with increased arc current, thus indicating a very substantial and important magnetic action at the higher currents;

FIGURE 7 is a graph illustrating the relationship between the energy required for acceleration of the gas, and the energy required for ionizing and dissociation thereof, and showing that efficient acceleration is achieved at the higher power levels;

Figure 1:
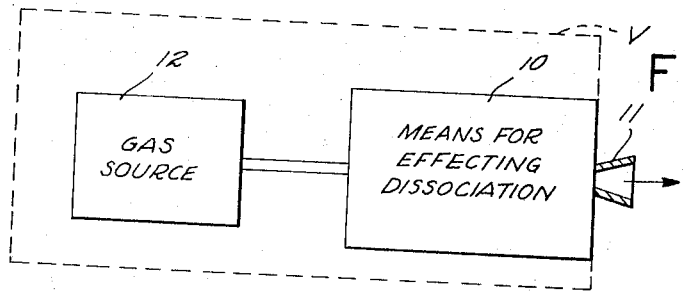
FIGURE 1 is a view schematically indicating the concept of discharging dissociated gas from a space vehicle without the use of mixing chambers, and with a minimum nozzle (or no nozzle), thereby permitting achievement of extremely high efficiencies.

Referring first to FIGURE 1 of the drawings, an apparatus is schematically illustrated wherein a suitable dissociator means 10 is adapted to pass gas directly into a nozzle which is schematically indicated at 11. The nozzle is sufficiently short (or non-existent) that the gas particles will not recombine before they emerge from the nozzle, it being emphasized that the illustrated nozzle is schematic only. The gas is fed to the dissociator 10 from a suitable source 12. In accordance with one important method of performing the present invention, the apparatus 10–12 is mounted on a space vehicle, indicated at V, and the nozzle 11 communicates with the ambient space so that the apparatus serves as a thruster for propulsion purposes.

Dissociator means 10 may comprise the contact-resistance heater described in detail in the above-specified co-pending patent application. The dissociator may also be of various other types, for example catalytic, and comprehends any means for dissociating a diatomic or polyatomic gas into a gas which is, at least until after discharge through the entire nozzle, monatomic.

Very desirably, the dissociator means is of the type described below relative to FIGURES 2–5. The dissociator means effects not only dissociation of the gas but also heating, ionization and acceleration thereof.

Prior-art workers attempted to effect recombination and/or deionization of the dissociated and ionized gas particles prior to the time of their emergence from the nozzle 11, the reason being that any recombination or deionization adds energy to the gas. According to the present method, however, the outlet opening or nozzle is made sufficiently short (or non-existent) that recombination or deionization, if it ever occurs, does not occur in substantial amount until after the particles leave the nozzle.

Stated in another manner, applicant has discovered that (as mentioned above) attempts to make the nozzle sufficiently long to permit recombination and/or deionization of dissociated and ionized particles are undesirable because the losses present in the nozzle are greater than any energy which may (or may not) be added to the gas as the result of any deionization or recombination. Furthermore, applicant believes that recombination and deionization do not occur even in relatively long nozzles which are usable on space vehicles. Therefore, applicant constructs and arranges the dissociator and the nozzle in such manner that the particles resulting from the dissociation will discharge as rapidly as possible, there being very low losses in the nozzle particularly when the nozzle is of the annular type described in the above-cited application, or is of the type to be described hereinafter.

Stated in yet another manner, applicant discharges the arc-heated gas through a sonic throat, at thermal velocities, instead of employing a means (such as a thermodynamic nozzle) to direct all gas particles in the same direction.

The increased efficiency, in comparison to conventional systems wherein mixing chambers and/or elongated nozzles are employed, may be on the order of twenty percent. Thus, with a much smaller and more economically manufactured apparatus, applicant has achieved a pronounced increase in efficiency.

The maximum specific impulse is achieved when the fuel stored in gas source 12 is molecular hydrogen, which hydrogen is dissociated into atomic form by the dissociator means 10 and is then discharged through the nozzle prior to recombination. Various other fuels may be employed, for example lithium. Furthermore, it is within the scope of the invention to employ compounds which may be readily stored and dissociated, and which dissociate into atomic hydrogen (or other light gas). The dissociated compound is discharged through the entire nozzle before the atomic hydrogen becomes molecular.

One example of such a compound is ammonia, $NH_3$, which dissociates at low temperature into atomic hydrogen and atomic nitrogen. Such dissociation may be achieved by passing ammonia gas through the contact resistance heater described in the above-cited patent application, and thereafter discharging the heated gas through the annular nozzle described in such application. Examples of other compounds which may be employed include lithium hydride (LiH), and boron hydride ($B_2H_6$).

In summary, therefore, one aspect of the method comprises dissociating a molecular fuel into an atomic state, and discharging the fuel through a nozzle before recombination can occur. In its broader aspects, such method also comprises dissociating a polyatomic gas into diatomic form, for example, and then discharging the diatomic gas from the space vehicle.

Figure 2:
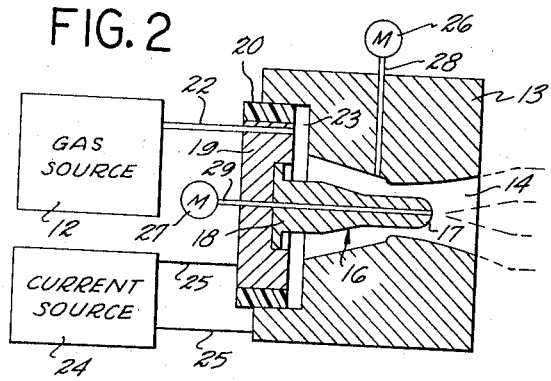
FIGURE 2 is a schematic sectional view of an apparatus for effecting heating and acceleration of gas, illustrating an extremely short nozzle, and also illustrating means to sense the pressures at various portions of the arc chamber.

Referring next to FIGURE 2 and to the related FIGURES 3–5, there will be described apparatus and methods for achieving desired specific impulses, either low or surprisingly high, in an extremely efficient manner. Such apparatus and methods make it highly practical to employ hydrogen as at least one of the fuels.

The apparatus is illustrated schematically to comprise a metal nozzle electrode 13 having a central passage 14 therethrough, such passage forming the arc chamber and also (in some instances) a short nozzle through which the heated gas discharges to the ambient space or atmosphere.

Mounted coaxially in passage 14 is a metal back or rear electrode 16, such electrode being illustrated as having a rounded arcing end portion 17 and an enlarged base portion 18. The arcing end portion is sufficiently large that the arc terminus may spread substantially, as will be described hereinafter. The base portion 18 is mounted in a metal base plate 19 which, in turn, is mounted in a recess in the nozzle electrode. The last-mentioned mounting is effected by means of an insulating element 20 adapted to electrically isolate the nozzle and rear electrodes from each other.

Passage 14 is illustrated as being convergent-divergent, with arcing end 17 in the divergent portion.

The base plate 19 may be generally disc shaped, and the insulating element 20 annular. The wall of passage 14 may be a surface of revolution about the axis of back electrode 16, which electrode may also have surfaces of revolution (for example, in the illustrated form, two cylindrical surfaces of revolution connected by a frusto-conical surface). It is to be understood that certain other electrode and passage configurations may be employed, some of which will be described relative to FIGURES 3–5.

The gas source 12 is connected through a conduit 22 to the interior of the device shown in FIGURE 2, for example to a chamber 23 defined between base plate 19 and an internal rearwardly-facing surface of nozzle electrode 13. The illustrated manner of communication is generally axial, but it is to be understood that the conduit 22 may also be disposed tangentially relative to the cylindrical side wall of the chamber 23.

Hydrogen or other gas from source 12 passes through conduit 22 and chamber 23 into passage 14, where it is arc-heated prior to discharging to the ambient space or atmosphere. The arc is generated between the end portion 17 of electrode 16 and a portion of nozzle electrode 13. Thus, the arc may engage nozzle electrode 13 at the forward end region of the wall of passage 14. The arc may also engage the forward face of the nozzle electrode (the radial face remote from base plate 19).

A suitable current source, indicated schematically at 24, is connected through leads 25 to base plate 19 and nozzle electrode 13, to supply the current which forms the arc. The current source should be adapted to supply an extremely large current, preferably a direct current, having a magnitude on the order of thousands of amperes.

Back electrode 16 is normally the cathode, and nozzle electrode 13 the anode.

The remainder of the illustrated apparatus comprises first and second pressure gauges 26 and 27 which are connected through conduit means 28 and 29 to various portions of the arc chamber. Conduit 28 communicates with the arc chamber radially outwardly of the end portion 17 of the rear electrode, whereas conduit 29 extends through the rear electrode to the extreme forward end or tip thereof. The apparatus 26–29 forms no part of the invention but is illustrated in order to facilitate discussion of various important pressure relationships to be specified hereinafter.

SYNOPSIS OF ADVANTAGES OF PASSING LOW-PRESSURE GAS THROUGH THE ARC APPARATUS

As previously indicated, prior-art workers have conventionally employed high gas pressures, for purposes including effecting constriction of the arc. The following are certain important advantages which are obtained through use of gases under low pressures, the pressures being substantially lower than atmospheric:

(1) The arc current may be increased until it is a number of times what has previously been thought to be the limit, without resulting in excessive deterioration of the electrodes.

(2) The great increase in arc current, permitted because of the use of low-pressure gas, creates a powerful magnetic pumping action.

(3) The low pressure of the gas is an important factor causing the discharging jet of plasma to have a relatively uniform velocity throughout its entire cross section, with consequent increased efficiency.

(4) The efficiency of transfer of heat from the arc to the gas is greatly increased, and (5) Dissociation of the gas is readily effected.

The result of the above and other (including the above-indicated absence of the conventional long nozzle and the mixing chamber) factors relative to the present invention is that the specific impulse may be increased from a prior-art value of less than twenty-five hundred seconds to more than ten thousand seconds, with very high efficiencies and with an extremely high thrust density. The high thrust density is important in that it permits the thruster to be very compact.

Various ones of the above-mentioned advantages will be set forth below, under individual headings.

METHOD AND APPARATUS FOR GENERATING EXTREMELY HIGH-CURRENT ARCS WITHOUT RESULTING IN SUBSTANTIAL ELECTRODE EROSION

When the pressure of the gas passed through the apparatus is only a small fraction of atmospheric, and/or when the rear electrode is disposed sufficiently far forward that the vacuum conditions existing in the space outside a space vehicle (or elsewhere) cause the pressure at the arc footpoint to be only a small fraction of atmospheric, the arc current may be increased enormously without resulting in melting or excessive erosion of the rear electrode or of the nozzle electrode. Thus, for example, the arc current may be increased from approximately fifteen hundred amperes to substantially in excess of thirty-five hundred amperes, and operated for hours, without resulting in melting or excessive erosion.

The indicated high currents are possible because the arc terminus does not engage or foot on the rear electrode 16 at only a limited central region of the arcing end 17 thereof, but instead spreads out and foots on a large portion of such arcing end 17. Accordingly, the entire end portion of the electrode, not just the tip, appears to glow. Inspection of the rear electrode shows relatively uniform erosive effects over the entire arcing end 17. Thus, the current density at any region is greatly reduced, so that the amount of heating at any region is insufficiently great to melt the electrode. The electrodes may, of course, be water cooled.

As previously indicated, the gas pressure at the arcing portion of rear electrode 16 is substantially below atmospheric, and should be only a small fraction of an atmosphere. More specifically, the pressure is on the order of about one-tenth atmosphere or lower. At least when the tip or front end of rear electrode 16 is disposed well back in passage or chamber 14, relatively isolated from the zero pressure in the ambient space, the pressure of the gas passed through the apparatus from gas source 12 should be sufficiently low that the specified low-pressure condition at the arcing tip is achieved. Such positioning of the tip of the rear electrode is indicated, for example, in FIGURES 3 and 4 and to some extent in FIGURE 2. As will be specified hereinafter, the gas pressure also depends upon other important factors including the magnitude of the arc current.

Achievement of the requisite low pressure may be aided by so disposing the rear electrode that the zero pressure in the ambient space may effect a reduction in the gas pressure at the arcing tip. Thus, for example, FIGURE 5 illustrates the positioning of the rear electrode in a forward location, very little nozzle or throat portion remaining.

It is pointed out that the arcing regions of both anode and cathode may be adjusted and regulated in various ways, in addition to properly shaping of the arcing surfaces, properly positioning of the rear electrode, etc.

Because the arc is not constricted but instead spreads over a large area, it will be understood that a very large proportion of the gas passes through the arc as distinguished from merely passing around the arc. Thus, there is an extremely efficient transfer of heat from the arc to the gas. This is to be contrasted with prior-art methods wherein the arc was an elongated constricted filament which was surrounded by the gas. Only a small proportion of the gas then passed through the arc, with consequent inefficient heat transfer.

MAGNETIC PUMPING ACTION ACHIEVED BY THE LOW-PRESSURE HIGH-CURRENT SYSTEM

Applicant has measured, relative to the indicated apparatus, specific impulses far in excess of eight thousand seconds. The stagnation temperature corresponding to eight thousand seconds is over one hundred thousand degrees K. If it were to be assumed that kinetic pressure forces are solely responsible for the acceleration of flow, it would be implied that static temperatures on the order of one hundred thousand degrees K. exist in the arc. Because the temperatures at the electrode surfaces are not substantially over three thousand degrees K. (or else the electrodes would melt), and because it is unlikely that the temperature gradients are such that the temperature of any part of the arc is on the order of one hundred thousand degrees K., the acceleration of the gas is probably effected not only kinetically but also magnetically.

It is logical to suppose, because of the heating effected by the arc, that an increase in arc current will result in a corresponding increase in the pressure in the arc chamber, such pressure being sensed by the manometer 26 (FIGURE 2). Referring to FIGURE 6, there is illustrated a curve wherein the current in the arc generated between electrodes 13 and 16 is plotted against the pressure sensed by manometer 26. It will be observed that, until the previously-known maximum current of about fifteen hundred amperes is achieved, the arc chamber pressure increases with current as would be expected. Very surprisingly, however, as soon are the arc current increases until it is substantially in excess of fifteen hundred amperes, the pressure sensed by manometer 26 decreases drastically. Thus, for example, the pressure at thirty-five hundred amperes is on the order of the pressure at five or six hundred amperes.

The pressure sensed by the second manometer, number 27 (FIGURE 2), increases as the pressure sensed by manometer 26 decreases. Because the second manometer 27 is responsive to the pressure at the exact center of the arcing region, there is a strong indication that magnetic forces create a substantial pressure which is effective to pump (accelerate) the gas out of the passage 14 and thereby effect a reduction in the pressure sensed by manometer 26.

Thus, one important benefit achieved by the present invention is to effect acceleration of gas magnetically, in the absence of excessively high temperatures. The indicated magnetic acceleration of gas should not be confused with the previously-known aspiration or thermal acceleration of gas by means of electric arcs. Such aspiration is referred to, for example, in Patents Nos. 2,929,952 and No. 3,064,153. The thermal acceleration is due substantially entirely to heating of the gas, without any important contribution by magnetic effects.

It is to be noted that the magnetic effects, while increasing the pressure at the central region of the tip 17 of rear electrode 16, aid in reducing the pressure along the cylindrical surface of the rear electrode (between the tip and the region radially-inwardly from the conduit means 28, for example). Thus, the magnetic action which is made possible by the high current, which high current is in turn made possible by the low pressure, it itself operative to aid in reducing the pressure at large portions of the rear electrode surface.

The exact current levels at which the magnetic effect dominates the thermal effect will vary in accordance with numerous factors, including the construction of the particular apparatus. In the apparatus shown in FIGURE 2, the region occurs between about fifteen hundred amperes and about two thousand amperes. Thus, one aspect of the invention relates to increasing the arc current sufficiently that the magnetic action is operative to dominate the thermal expansion action, so that only a small increase in the arc current reduces the chamber pressure instead of increasing the pressure as would be expected.

ADVANTAGE OF LOW PRESSURE IN INCREASING THE SPECIFIC IMPULSE OF THE DISCHARGING JET

The discharging jet of hot gas or plasma (generated by arc-type accelerators or thrusters) has a relatively hot center core and a relatively cold peripheral or sheath portion. In prior-art arc-type accelerators, the center core was extremely small in cross-sectional area, in comparison to the over-all cross section of the jet, because of the arc-pinching action of the high-pressure gas passed through the apparatus. Thus, it has been found that the center core of a conventional or prior-art arc-type accelerator operates at temperatures which correspond to several times the average specific impulse. Therefore, a principal characteristic of conventional arc-generated jets is extreme disuniformity relative to both velocity and temperature profiles. "Velocity profile" and "temperature profile" denote differences in velocity or temperature (respectively) which may be measured at different points across the jet (that is to say, at different radial distances from a particular point on the jet axis).

The above-stated disuniformity in velocity profile is highly detrimental. Therefore, substantial increases in efficiency my be achieved by making the jet relatively uniform in velocity profile throughout the entire cross section thereof. This phenomenon may be understood by consideration of the following hypothetical example. Let it be assumed that, in a particular arc-generated gas jet, the center (axial) core has a velocity of 10 whereas the outer portion has a velocity of 1. Let it also be assumed that the mass flow in the center portion is the same as in the outer portion (although, in prior-art devices, the mass flow in the center portion is only a very small proportion of the total mass flow). Under these conditions, the average velocity in the jet is 5.5. Such average velocity is proportional to the average specific impulse.

Because the kinetic energy in each portion of the jet is proportional to the square of the velocity, the above-specified average velocity is obtained by the expenditure of an energy which is proportional to 101.

Let it next be assumed that the velocity in the outer portion of the jet is 5.5, and that the velocity in the center portion is also 5.5, the average velocity being again 5.5 as in the above-specified example. Let it also be assumed that, as stated above, one-half the mass flow occurs in each portion of the jet. To obtain such average velocity of 5.5 relative to the second example, the required energy is proportional to 60.5.

From the above it will be understood that, when the velocity profile of the jet is uniform, much less energy is required to obtain the same average velocity (proportional to specific impulse) than when the velocity profile is disuniform. The differences may actually be greater than in the given illustration, the illustration being only a simple one intended to illustrate the principle.

By drastically lowering the pressure of the gas passed through the torch apparatus, in comparison to prior-art methods, applicant achieves a very substantial improvement in the velocity profile of the jet, the velocity being rendered relatively uniform throughout the entire cross section. When the pressure is low, the center core is not greatly constricted but instead expands, whereas the thickness of the relatively cold outer sheath is greatly reduced. Because the center core in a jet generated by the present low-pressure apparatus is much larger than in prior-art apparatus, there is a greatly augmented heat transfer from the center core to the outside sheath—which also aids in improving the uniformity of the jet relative to velocity profile.

Accordingly, for the reasons stated above, the average specific impulse of the jet emanating from applicant's low-pressure apparatus is much greater, for a given energy input, than in the high-pressure apparatus of the prior art. Furthermore, as will be set forth in detail hereinafter, the uniformity of the jet velocity may be further improved (and other important advantages achieved) by introducing into the center of the jet a gas having a relatively high molecular weight in comparison to that of the gas in the sheath or outer portion of the jet.

Figure 3:
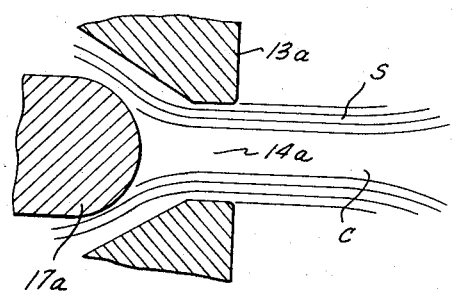
FIGURE 3 is an enlarged fragmentary sectional view illustrating the nozzle portion of an apparatus which corresponds to the apparatus illustrated in FIGURE 2 except for the configuration adjacent the arcing tip of the elongated electrode.
Figure 4:
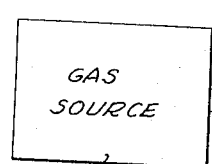
FIGURE 4 is a fragmentary sectional view corresponding generally to FIGURE 3 but illustrating an additional gas source adapted to introduce gas axially into the discharging jet, thereby increasing the uniformity of the jet.
Figure 5:
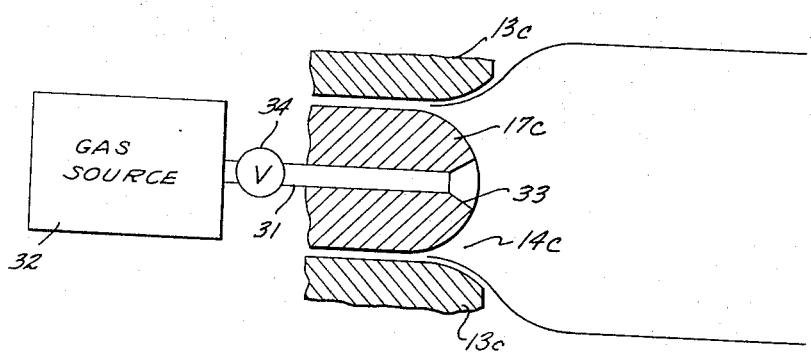
FIGURE 5 is a schematic view corresponding generally to FIGURE 4 but illustrating a different configuration wherein the rear electrode is advanced until substantially no nozzle region remains, thereby achieving benefits including a relatively uniform velocity throughout the cross-section of the jet.

FURTHER DESCRIPTION OF THE METHOD, AND DESCRIPTION OF THE APPARATUS OF FIGURES 3-5

Referring first to FIGURE 3, the arcing end portion is illustrated at 17a, corresponding to arcing end portion 17 (FIGURE 2) except that there is no conduit means 29 therethrough. The nozzle is shown at 13a. The center core of the jet is indicated at C, whereas the outer or sheath portion is indicated at S. As stated above, the diameter of such core portion C expands, and the thickness of the sheath S reduces correspondingly, as the pressure of the gas passed through the torch is reduced. A desirable pressure is on the order of a small fraction of an atmosphere, for example approximately 0.10 atmosphere. It is to be understood, however, that much lower pressures may be employed. The indicated low pressures not only achieve a relatively uniform jet, but also achieve the various advantages indicated herein relative to minimized electrode erosion, attainment of high currents, etc.

Referring next to FIGURE 4, the arcing end portion of the rear electrode is indicated at 17b, having extended therethrough a conduit means 31 which is connected to a second gas source 32. Conduit means 31 is axial of the portion 17b, and communicates with the main arc chamber through a divergent portion 33. Thus, gas introduced into the jet from the second gas source 32 forms the center core C, the outer or sheath portion being formed primarily by gas from the first source 12 and being indicated at S. The type of gas introduced from the second gas source 32 will be specified in detail hereinafter. The nozzle is shown at 13b.

Referring to FIGURE 5, the nozzle electrode is indicated fragmentarily at 13c, having a discharge portion which is substantially larger in diameter (relative to the diameter of the arcing tip 17c of the rear electrode) than in the case of the electrodes 13a and 13b shown in FIGURES 3 and 4. Thus, the diameter of the passage through the nozzle electrode 13c (FIGURE 5) is sufficiently large that the arcing tip 17c may be moved forwardly until its forward end is generally in the same plane as the radial front face of electrode 13c. There is, therefore, an extremely short nozzle region which permits achievement of the advantages specified above relative to FIGURE 1, and permits the pressure at the arcing tip 17c to be low due to the fact that such tip is relatively exposed to the zero pressure in the ambient space. Also, and very importantly, the indicated substantially no-nozzle configuration further improves the velocity profile of the jet because there is relatively little arc-constriction action effected by the discharging gas.

The second gas source 32 is shown as connected through a valve 34 and the conduit portions 31–33 to the center of arcing tip 17c. When the valve 34 is in open condition, gas is introduced into the center portion of the jet to achieve a further improvement in velocity profile, and other advantages specified below.

It is emphasized that the nozzle portions of electrodes 13a and 13b are also extremely short in comparison to the nozzles of prior-art thrusters, so that advantages specified relative to FIGURE 1 are achieved.

METHOD OF IMPROVING EFFICIENCY BY INTRODUCING PARTICULAR GASES INTO THE CENTER PORTION OF THE DISCHARGING JET

Referring first to FIGURE 7, first and second curves 36 and 37 are illustrated wherein specific impulse is plotted against the kilowatts of power introduced into the torch or thruster apparatus. Curve 36 is a theoretical curve which represents the power needed to achieve kinetic acceleration (not considering ionization and dissociation). Curve 37, also theoretical, represents the additional power which is needed to dissociate and fully ionize the gas. Thus, the vertical distance between curves 36 and 37 represents energy which is required for effecting ionization and dissociation of the gas. The curves are plotted for hydrogen, the mass flow being one gram per second.

FIGURE 7 illustrates the fact that, at the relatively high values of specific impulse, substantially all of the energy introduced into the jet results in increased kinetic energy, with consequent extremely high efficiencies. Conversely, at the relatively low values of specific impulse, large portions of the energy are required for ionization and dissociation, with consequent relatively low efficiencies.

It has been found that the above-indicated introduction of a second gas into the center portion of the jet is particularly advantageous for the low specific impulse situation, although it is also highly advantageous for the high specific impulse situation.

According to the present method, the gas introduced into the center of the jet is relatively heavy in comparison to the gas comprising the outer or sheath portion of the jet, and (preferably) is a gas which requires relatively little energy for ionization and/or dissociation in comparison to the energy which produces acceleration. Furthermore, and very importantly, the molecular weight of the gas introduced into the center of the jet is proportioned to the temperature thereof in such manner that the entire jet will have a substantially uniform velocity profile.

In prior-art methods, it has been proposed to mix gases producing high specific impulses with gases producing low specific impulses, by using various gases at substantially the same temperature. However, because of such substantial uniformity of temperature, the velocities of the gases were greatly different. The result was that turbulence and shear, and the above-specified disadvantages of non-uniform velocity profiles, combined to destroy efficiency. In the present method, on the other hand, applicant effects a proportioning of temperature to mass in such manner that the velocities of the gas particles in the core are substantially equal to the velocities of the gas particles in the sheath.

It has also been proposed by prior-art workers, for example in metal-cutting applications, to surround a high-temperature core with a sheath of protective gas adapted to prevent deterioration of electrodes. Such methods do not, however, involve the proportioning of temperature and mass to obtain the relatively uniform velocity profile which characterizes the present invention.

Because the center core of the jet is very hot, the gas introduced therein (for example from the second gas source 32, FIGURES 4 and 5) should be much heavier than the gas introduced from the first gas source 12 (FIGURE 2), so that the velocity profile will be substantially uniform. When a gas is relatively heavy, a much higher temperature is required to accelerate the same, so that the relatively heavy gas introduced into the hot center core will not be accelerated more than will the relatively light gas present in the cool outer sheath.

Various combinations of heavy and light gases may be employed, and at various temperature distributions. In accordance with one advantageous combination of gases, the gas introduced from the second source 32 is lithium, whereas that introduced from the first source 12 is hydrogen. Because lithium is approximately seven times heavier than hydrogen, the temperature of the core C (FIGURE 4) of the jet is caused to be much higher than the temperature in the sheath S thereof, the exact temperatures being selected to achieve a relatively uniform velocity throughout the jet cross section. The lithium may be accelerated more efficiently than hydrogen because less energy is required for ionization, and because lithium is monatomic so that no energy is required for dissociation. On the other hand, the relatively cool hydrogen produces the desired effect of preventing deterioration of the electrodes. Thus, the combination of lithium with hydrogen provides numerous highly beneficial results, as do combinations of certain other gases when employed in accordance with the method specified herein.

The short nozzle is very important relative to the described double jet, because very little mixing of the two gases occurs. It will be understood that a mixture of lithium and hydrogen, for example, would not produce the above-mentioned advantages.

EMBODIMENT OF FIGURE 8

Figure 8:
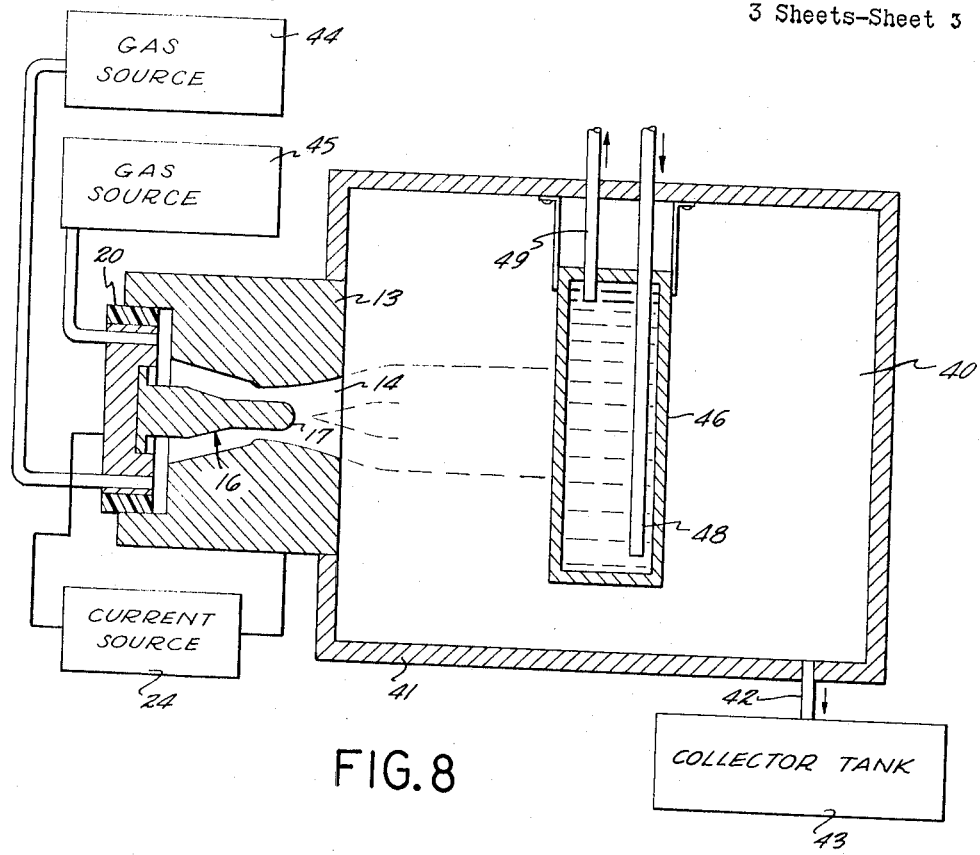
FIGURE 8 is a view schematically representing an apparatus for effecting chemical synthesis and other chemical effects by means of the present invention.

In the embodiment of FIGURE 8, the torch apparatus shown in FIGURE 2, or in any of FIGURES 3–5, is adapted to direct the discharging jet into a chamber 40 which is defined by a suitable wall means 41. For example, the nozzle electrode 13 may be sealingly mounted in one portion of the wall means 41, as illustrated. The chamber 40 is substantially sealed, having connected thereto an outlet conduit 42 leading to a tank or other receptacle 43 for the material resulting from the chemical reaction occurring in the chamber 40.

Gas sources 44 and 45 are shown as connected to the chamber within the torch apparatus, being adapted to introduce different gases therein. One of such sources (or an additional source) may communicate with a central opening in the back electrode 16, as described relative to FIGURES 4 and 5. It is also within the scope of the invention to introduce various liquid, solid (particulate)

or gaseous substances into various portions of the jet or torch, for example through a portion of the wall means 41.

In performing the method with the apparatus thus far described relative to FIGURE 8, the chamber 40 is first purged of air and then filled with gas at a suitable relatively low pressure which is a small fraction of atmospheric pressure. Gas sources 44 and 45 (or one of such sources) are then employed to introduce gas at a slightly higher pressure (but still only a fraction of atmospheric) through the torch and into the chamber. Current source 24 is then employed to maintain an extremely high-current arc, as described heretofore, thereby effecting a very high degree of ionization, dissociation and acceleration of the gases passed through the torch. Such gases therefore react with each other to produce various desired substances, which substances may be drawn off through the conduit means 42 into collector tank 43. Other receiving means may be provided for different reaction products (for example, gaseous products).

A plate 46 is fixedly mounted in chamber 40 in the path of the jet emanating from the torch. Plate 46 is effectively cooled, for example by means of water which is continuously circulated therethrough by means of conduits 48 and 49. The plate is preferably metallic, and may form one of the electrodes for the arc. Thus, for example, an arc may be maintained between rear electrode 16 and plate 46, in addition (or alternatively) to maintaining the arc between rear electrode 16 and nozzle electrode 13. Furthermore, the arc may be maintained between the nozzle 13 and the plate 46.

When the high-velocity jet impinges against the surface of plate 46, the pressure is drastically increased (adjacent the surface of the plate) to provide an action which is highly conducive to combination of the ionized and dissociated substances. Thus, the plate 46 aids greatly in effecting the chemical reactions of which the illustrated apparatus is capable. The plate 46 may be termed a stagnation means to effect sudden stagnation of the discharging jet, with consequent great increase in pressure.

A very great variety of gases and other substances may be introduced from sources 44 and 45. Furthermore, various substances may be mixed in the sources 44 and/or 45 and then introduced into the torch or jet.

It is emphasized that the present method does not relate primarily to the reacting of specific substances, but instead to the creation of velocity, pressure, ionization and dissociation conditions such that myriads of new chemical reactions are rendered possible, and previously-known chemical reactions are caused to occur more efficiently and effectively. Reference is made to the following two articles for examples of chemical reactions which may be performed by means of the present method and apparatus: Producing Acetylene in a Plasma Jet, vol. 53, No. 5, May 1961, pp. 341–342 of Industrial and Engineering Chemistry, authors Hans W. Leutner and Charles S. Stokes; and The Plasma Jet in Chemical Synthesis, vol. 52, No. 4, April 1960, pp. 287–288 of Industrial and Engineering Chemistry, authors C. S. Stokes and W. W. Knipe.

EMBODIMENT OF FIGURE 9

Figure 9:
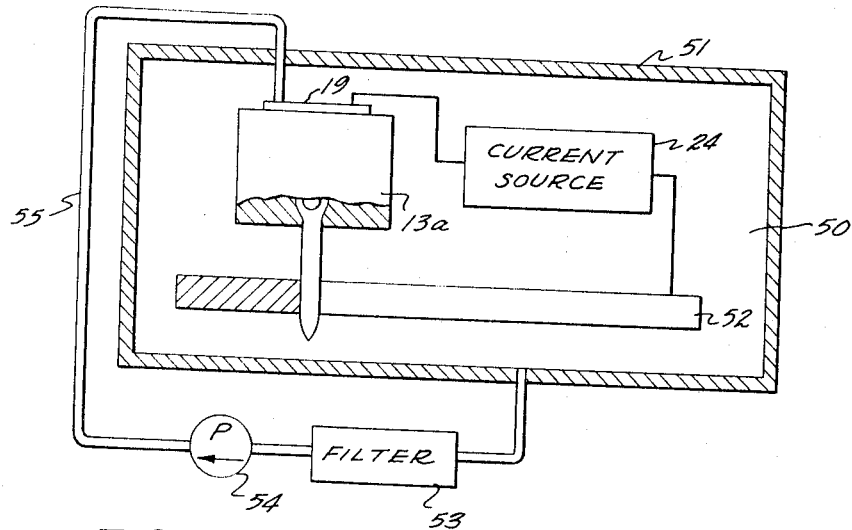
FIGURE 9 is a view schematically representing the cutting of a metal plate by means of the present invention.

Referring next to FIGURE 9, the torch described relative to FIGURE 3, for example, is shown as mounted in a sealed chamber 50 which is defined by a wall means 51. The current source 24 is connected between the rear electrode of the torch and a metal plate 52 or other suitable workpiece to be cut, welded, fusion surfaced, etc. A filter 53 and recirculating pump 54 are connected in a recirculating conduit 55 adapted to draw gas from chamber 50 and introduce such gas into the arc chamber within the torch.

The gas pressure within the chamber 50 is caused to be only a small fraction at atmospheric, as is the pressure of the gas in the arc chamber within the torch. However, the pressure of the gas introduced into the torch is, of course, somewhat higher than that within chamber 50.

The pump 54 may be eliminated and the pumping action effected entirely by the arc.

It is to be understood that current source 24 may be connected between the rear electrode and the nozzle electrode 13a. Furthermore, a current source may be connected between nozzle electrode 13a and the work 52. Additional current sources may be employed, and connected between various ones of the indicated elements. Various gas sources may be employed to introduce gases (such as oxygen) adapted to aid in the cutting action relative to mild steel workpieces, for example. It is within the scope of the invention to employ several gas sources to provide a compound jet as described relative to gas source 32, FIGURES 4 and 5.

In performing the method, current source 24 is caused to supply an extremely large current, such current being possible (without melting the electrodes) because of the fact that the gas passed through the torch is at a pressure which is only a small fraction of atmospheric as stated heretofore. Because the current is extremely large, and because of the numerous factors set forth previously herein relative to the efficiency of the discharging jet, and the degree of ionization and dissociation thereof, the rate of cutting the workpiece 52 is extremely great. Furthermore, the depth of cut may be far greater than may be achieved with presently known apparatus and methods.

The foregoing detailed description is to be clearly understood as given by way of illustration and example only, the spirit and scope of this invention being limited solely by the appended claims.

I claim:
1. Electric-arc apparatus, which comprises:
   electrode means adapted to provide at least one terminus for an electric arc,
      said electrode means having sufficient surface area that said arc may spread substantially at said terminus,
   means to maintain a high-current electric arc extending to said terminus, and
   means to pass gas adjacent said terminus and at a pressure substantially below atmospheric whereby to effect spreading of said arc at said terminus.

2. The invention as claimed in claim 1, in which said last-named means maintains the gas pressure at said terminus at a value which is a small fraction of atmospheric.

3. The invention as claimed in claim 1, in which said last-named means maintains the gas pressure at said terminus at a value which is below about 0.1 atmosphere.

4. Electric-arc apparatus, comprising:
   wall means to define an arc chamber having an outlet opening therefrom,
   electrode means having an arcing portion disposed in said chamber,
   means to maintain a high-current electric arc extending to said arcing portion, and
   means to introduce gas continuously into said arc chamber at a pressure which is sufficiently below atmospheric that said arc will spread substantially at said arcing portion and will accordingly have a low current density thereat,
      said gas being heated by said arc and discharging through said outlet opening.

5. The invention as claimed in claim 4, in which said arc-maintaining means is so constructed and connected that said arcing portion forms the cathode of a D.C. arc circuit.

6. Electric-arc apparatus, which comprises:
   a nozzle electrode having a passage therein communicating with the ambient region,
   a rear electrode having an arcing portion disposed in said passage,
   means to pass through said passage to said ambient region a gas having a pressure which is only a small fraction of atmospheric, and means to maintain between said electrodes a high-current electric arc,
said arc spreading over a large area of at least said rear electrode as the result of the lower pressure of said gas.

7. A method of maintaining an extremely high-current electric arc in an arc-gas apparatus and in the absence of excessive electrode deterioration, which method comprises:
providing electrode means having an arcing portion adapted to maintain an extremely high-current electric arc,
causing the gas pressure at said arcing portion to be substantially below atmospheric,
maintaining an extremely high-current electric arc to said arcing portion,
said arc spreading over a substantial region of said arcing portion as the result of the low gas pressure thereat, and
continuously passing gas through and adjacent said arc.

8. A method of maintaining an extremely high-current electric arc in an arc-gas apparatus and in the absence of substantial electrode deterioration, which method comprises:
providing electrode means having an arcing portion adapted to maintain an extremely high-current electric arc,
flowing in contact with said arcing portion a gas having a pressure which is only a small fraction of atmospheric,
causing the gas pressure at said arcing portion to be substantially below atmospheric, and
maintaining an extremely high-current electric arc to said arcing portion,
said arc spreading over a substantial region of said arcing portion as the result of the low gas pressure thereat.

9. The invention as claimed in claim 4, in which the pressure of said gas flowing over said arcing portion is on the order of 0.1 atmosphere and lower.

10. A method of effecting propulsion of a space vehicle, which comprises:
providing on a space vehicle an electrode having an arcing portion adapted to sustain a high-current electric arc,
discharging in contact with said arcing portion and into the ambient space a gas having a pressure, when passing in contact with said arcing portion, which is only a small fraction of atmospheric, and
maintaining a high-current electric arc to said arcing portion and thereby effecting heating of said gas prior to discharge thereof from said space vehicle.

11. A method of effecting pumping of a gas, which comprises:
defining a chamber which communicates with an adjacent region,
passing gas through said chamber to said region, and maintaining in at least a portion of said chamber at least a portion of an electric arc,
said arc being maintained by supplying an arc current which is sufficiently high that only a slight increase in arc current results in a decrease in the gas pressure in said chamber.

12. A method of magnetic pumping, which comprises:
generating an electric arc between first and second spaced electrodes,
passing a gas through said arc, and
increasing the current of said arc to a value substantially in excess of fifteen hundred amperes and to such a value that an incremental increase in said arc current results in a decrease in the pressure of said gas adjacent said arc.

13. The invention as claimed in claim 12, in which said method includes the step of passing said gas through said arc at a pressure substantially below atmospheric.

References Cited by the Examiner
UNITED STATES PATENTS

| Number | Date | Name | Class |
|---|---|---|---|
| 2,635,422 | 4/1953 | Landgraf | 60—35.6 |
| 2,850,662 | 9/1958 | Gilruth et al. | |
| 2,862,099 | 11/1958 | Gage | 219—74 |
| 2,886,692 | 5/1959 | Oyler et al. | 219—69 |
| 2,951,143 | 8/1960 | Anderson et al. | 204—171 X |
| 3,051,639 | 8/1962 | Anderson. | |
| 3,066,528 | 12/1962 | Giannini et al. | |
| 3,069,848 | 12/1962 | Griffith | 60—35.6 |
| 3,075,065 | 1/1963 | Ducati et al. | |
| 3,077,108 | 2/1963 | Gage et al. | |
| 3,082,314 | 3/1963 | Arata et al. | 313—231.5 |
| 3,091,079 | 5/1963 | Kunen | 60—35.5 |
| 3,091,920 | 6/1963 | Matvay | 219—75 X |
| 3,119,758 | 1/1964 | Orbach | 204—171 |
| 3,121,675 | 2/1964 | Case | 204—171 |
| 3,149,459 | 9/1964 | Ulam | 60—35.5 |
| 3,149,460 | 9/1964 | La Rocca | 60—35.5 X |

OTHER REFERENCES

Space Aeronautics, vol. 33, No. 5, May 1960, pp. 42–45 relied on.

Chemical Engineering Progress, vol. 56, No. 4, April 1960, pp. 60–63 relied on.

Propulsion Systems for Space Flight, by Corliss, McGraw-Hill, New York, N.Y., 1960, pp. 173–182 relied on.

CARLTON R. CROYLE, *Primary Examiner.*

MARK NEWMAN, *Examiner.*